United States Patent Office 3,705,805
Patented Dec. 12, 1972

3,705,805
PHOTOGRAPHIC LAYERS CONTAINING COMPOUNDS WHICH ABSORB ULTRAVIOLET LIGHT
Fritz Nittel, Cologne, Johannes Sobel, Leverkusen, and Wolfgang Himmelmann, Opladen, Germany, assignors to Agfa-Gevaert Aktiengesellschaft, Leverkusen, Germany
No Drawing. Filed Nov. 12, 1971, Ser. No. 198,460
Claims priority, application Germany, Nov. 14, 1970, P 20 56 177.7
Int. Cl. G03c 1/84
U.S. Cl. 96—84 R                       10 Claims

ABSTRACT OF THE DISCLOSURE

A photographic material comprising a mixture of an UV absorbent of a benzotriazole compound and a condensation compound of hydroxybenzaldehydes or alkoxybenzaldehydes or hydroxyketones or alkoxyketones with compounds containing active methylene groups having a melting point below 60° C.

---

The invention relates to layers which contain UV-absorbents for photographic materials.

Numerous compounds are known which absorb the UV-portion of light and are, therefore, suitable for the preparation of UV filters and UV protective coatings. These coatings are used in the photographic industry for increasing the light fastness of color images. To provide the greatest effect the UV absorbents should be incorporated in as high a concentration as possible in a separate protective layer. It is generally not possible to distribute the UV absorbents homogeneously or heterogeneously in the same layer as the image dyes because the absorbents and dyes are frequently found to react with each other which results in substantial bleaching of the image. The UV absorbents should, as far as possible, be colorless and should have a high extinction value in the UV range and high stability.

The UV absorbents may be used in various forms, e.g. in water-insoluble binders. The finished color image is coated with such a solution in a separate operation. This procedure is economical only for large format images and is, therefore, not generally applicable. The diffusion fast incorporation of water-soluble and water insoluble UV absorbents in a protective layer has also been described. For this method a UV absorbent must satisfy certain requirements as regards its chemical and physical nature, for example it must be able to be used in a highly concentrated form in layers which have a thickness of 2–3µ without crystallizing or being deposited in the form of an oil and separating from the layer. An UV absorbent must not, of course, react with the photographic processing baths or undergo yellowing when exposed to light. Various UV absorbents have already been described for the present purpose but none of them has satisfied the requirements in practice to a sufficient extent.

Various UV absorbents have been recommended, in particular aromatic azines, but these generally have a high melting point so that they are difficult to use owing to the tendency to crystallization which is related to the high meling point. Derivatives of this type, e.g. those described in U.S. Patent Specification No. 3,437,483, which can readily be incorporated in photographic layers, have a slight yellowish intrinsic color so that they spoil the whites in color images. The reason for this lies in a certain amount of absorption of light from the visible region of the spectrum.

The UV absorbents of the 2-phenylbenzotriazole type which have been described in U.S. patent specification No. 3,189,615 and U.S. patent specification No. 3,253,921, which satisfy the requirements of photographic practice as regards their absorption properties, are also only of limited use because they tend to separate from the photographic layers by crystallization.

It is an object of the invention to develop photographic layers which contain UV absorbents which can be easily incorporated in the layers and if possible absorb only in the UV region of the spectrum.

A photographic material having at least one layer which absorbs ultraviolet light has now been found which contains as UV absorbents mixtures of compounds of the 2-(2'-hydroxyphenyl) benzotriazole series represented by the Formula I which have at least one alkyl or alkoxy group with a total of 6–18 C-atoms or a cycloaliphatic group and an alkyl or alkoxy group with up to 12 C-atoms attached to the benzo ring or to the phenolic benzene ring and in addition an UV absorber condensation compound (II) having a melting point below 60° C. represented by the Formula II.

2-(2'-hydroxyphenyl)-benzotriazoles of the following formula are preferred:

(I) 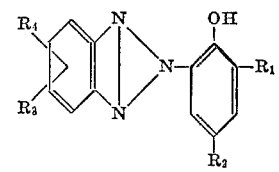

wherein $R_1$=(1) hydrogen, (2) alkyl, preferably branched and in particular those having up to 5 C-atoms, (3) cycloalkyl, e.g. cyclopentyl or cyclohexyl, (4) halogen, preferably chlorine or bromine, (5) a substitutent of the phenyl series or (6) phenoxy;

$R_2$=(1) hydrogen, (2) alkyl having preferably up to 12 C-atoms, in particular branched alkyl, (3) cycloalkyl, e.g. cyclopentyl or cyclohexyl, (4) alkoxy, preferably short-chained, e.g. with up to 4 C-atoms, (5) halogen such as chlorine or bromine, (6) phenyl or (7) phenoxy;

$R_3$=(1) hydrogen, (2) alkyl having preferably up to 4 C-atoms, (3) alkoxy having preferably up to 12 C-atoms, in particular with branched alkyl groups, (4) halogen such as chlorine or bromine, (5) phenyl or (6) phenoxy;

$R_4$=(1) hydrogen, (2) alkyl, in particular short-chained alkyl having up to 3 C-atoms, (3) alkoxy having preferably up to 8 C-atoms and in particular with branched alkyl groups, or (4) halogen such as chlorine or bromine;

The following are examples of suitable UV absorbents of this series:

I.1 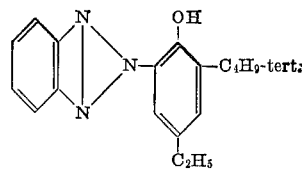

I.2 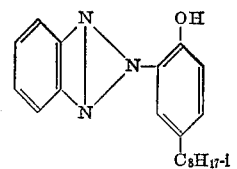

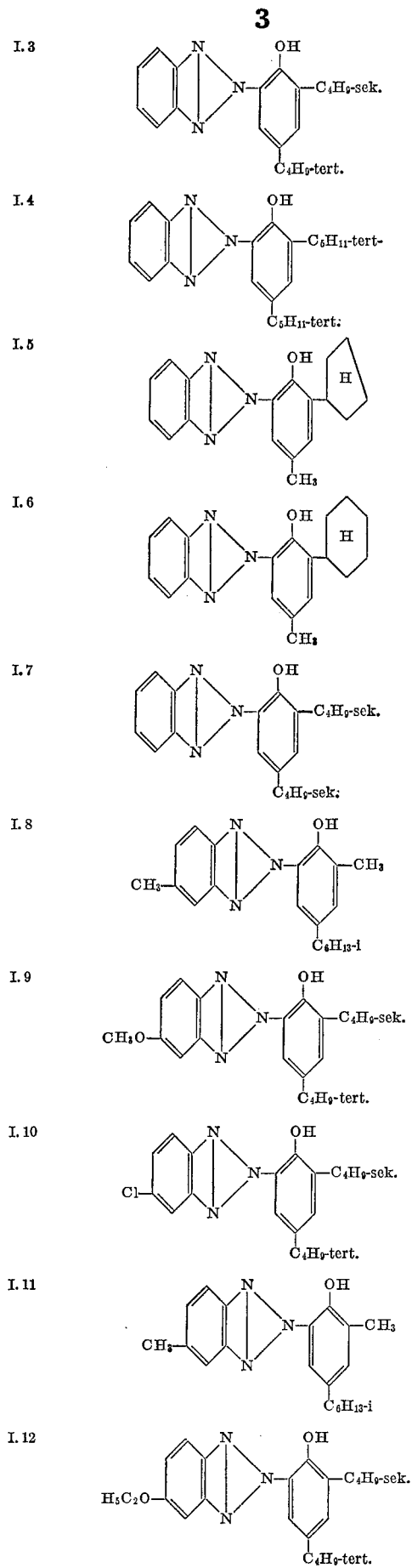
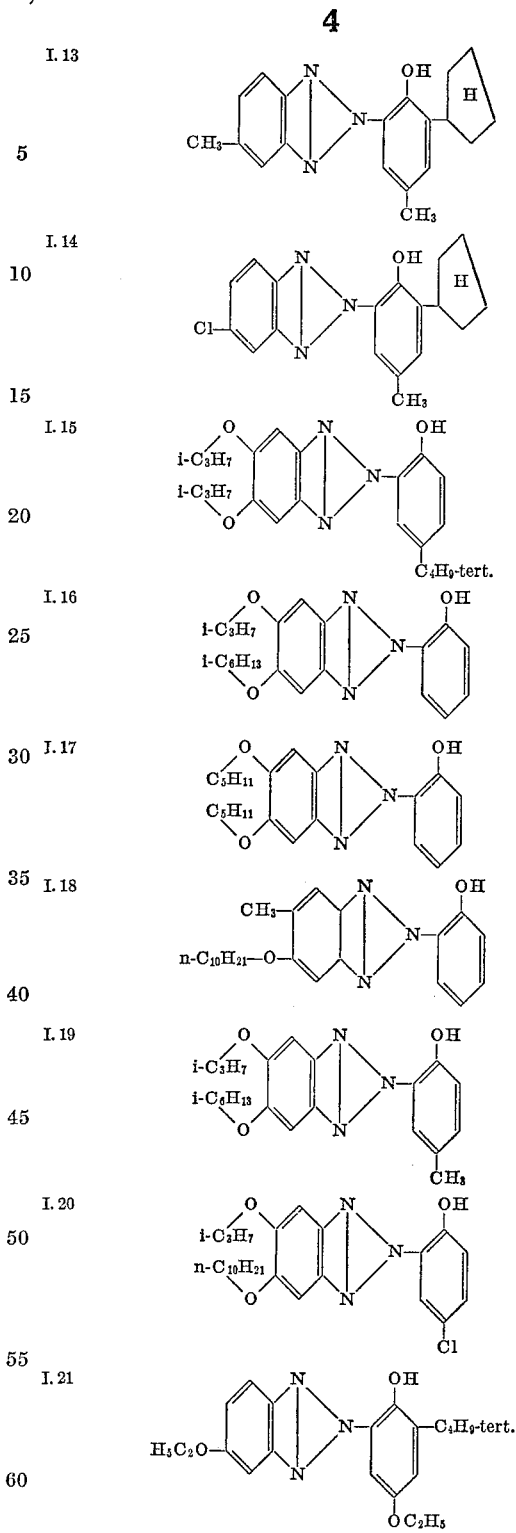

Other suitable benzotriazole absorbents of this series have been described in U.S. patent specifications No. 3,189,615, No. 3,253,921 and No. 878,220 and in British patent application No. 28,690/71.

The benzotriazoles mentioned are prepared by methods known in literature. Reference may be made e.g. to the above mentioned U.S. patent specifications or British application.

The oily UV absorber compound (II with a melting point below 60° C., which is used in admixture with the benzotriazole UV absorbents is a reaction product of hydroxybenzaldehydes or alkoxybenzaldehydes or hydroxybenzoketones or alkoxybenzoketones with compounds which contain active methylene groups and which condensation products are represented by the following formula:

(II) 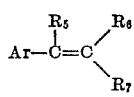

wherein $R_5$ = (1) hydrogen, (2) alkyl having preferably up to 3 C-atoms, (3) cycloalkyl, (4) aralkyl such as benzyl or phenylethyl, (5) phenyl or (6) alkoxy having preferably up to 3 C-atoms;

$R_6$ = (1) nitrile, (2) carboxyl (3) esterified carboxyl, the alcohol component used for esterification being preferably an aliphatic alcohol component having more than 5 C-atoms, or (4) acyl, in particular those acyl groups which may be derived from aliphatic carboxylic acids with up to 12 C-atoms;

$R_7$ = hydrogen or $R_6$;

Ar = a benzene ring which is substituted with one or more hydroxyl or alkoxy groups which have preferably up to 3 C-atoms and optionally also other substituents.

The following are examples of suitable UV absorbents of this series:

II.1 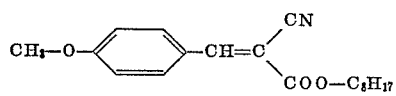

II.2 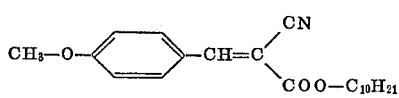

II.3 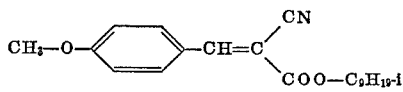

II.4 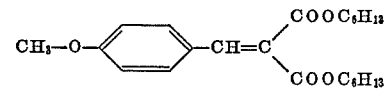

II.5 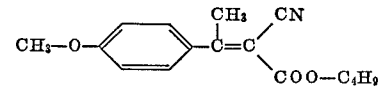

II.6 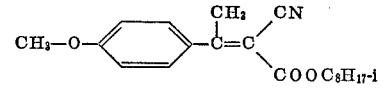

II.7 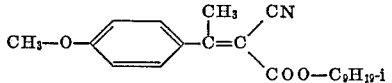

Other suitable compounds of this series have been described in the U.S. patent specification 3,278,448.

The compounds mentioned above are prepared by methods known in the literature. See also U.S. patent specification No. 3,180,885.

The proportion of benzotriazole UV absorbents (I) based on the total quantity of UV absorbents may vary within wide limits. Especially advantageous effects are obtained with quantities of 0.3–3 parts by weight of (I) to 1 part by weight of (II), preferably 1:1.

The mixtures of UV absorbents used according to the invention differ from the usual mixtures of UV absorbents with conventional oil-forming agents which are not absorbent to UV light but which are added to assist incorporation of additives, in having considerably improved absorption properties. Particular advantages of the mixtures according to the invention are the ease with which they can be emulsified and their excellent compatibility with gelatine and the consequent ease with which they can be incorporated in a photographic layer.

The compounds II which are used as oil-forming agents do not constitute ballast materials because they are themselves absorbent to UV light. The tendency to crystallization of the highly active UV absorbent I is substantially suppressed in the mixture and the layers obtained have excellent stability. Coarsening of the particles and hence precipitation do not occur even with prolonged storage of the casting solutions or the layers.

The total concentration of the UV absorbents in the photographic layer may also vary within wide limits according to the intended use and the required effect. An addition of 0.1–1 part by weight for one part by weight of layer binder has been found to be sufficient in most cases.

At these concentrations, the layers obtained are practically clear with barely detectable opalescence. No yellowing or impairment of the image whites is observed. The high light fastness of the UV absorbents is particularly advantageous.

The mixtures of UV absorbents are emulsified as solutions in low-boiling solvents in the casting solutions for the layer by means of a suitable dispersing apparatus.

The proportion of UV absorbents to solvents in the mixture may vary between 1:1 and 1:10. Suitable solvents are e.g. ethyl acetate, methylene chloride, alcohols and mixtures of these solvents. After dispersion, the low-boiling solvents are removed by evaporation in thin-layer evaporators under vacuum. Water-insoluble high-boiling compounds may be used in addition, e.g. dibutylphthalate or tricresyl phosphate but preferably higher fatty acids, in particular branched fatty acids having 10–20 C-atoms.

Mixing proportion 1:1–1:0.1 (mixture:solvent)

The UV absorbents according to the invention have an absorption maximum at about 340–350 nm. (compounds I) or about 320 nm. (compounds II) in the layers which contain gelatine. The absorption flank towards the longer-waved region drops steeply and closely adjacent to the visible region of the spectrum.

The absorption properties of UV absorbents are particularly critical when the absorbents are used for protective layers in photographic materials. The image dyes which are to be protected are generally azomethine dyes which are relatively sensitive to UV light so that they are in many cases destroyed even by the long-waved portion of the UV region of the spectrum. For this reason, the absorption flank should in these cases be as close as possible to the visible region, i.e. at about 400 nm. Impairment of the image whites is often unavoidable in these cases since the UV absorbents will then already absorb in the blue region of the spectrum. The choice of suitable UV absorbents is particularly critical on account of these almost contradictory practical requirements, namely that of providing the widest possible protection for the image dye against ultraviolet radiation even from the longer-waved region and that of avoiding impairment of the image whites.

The combination of UV absorbents I and II according to the preferred embodiments of this invention is particularly effective in this respect.

Another advantage of the combination of UV absorbents is the reduction in the tendency to crystallization, particularly that of the benzotriazole UV absorbents which in their pure form can only be used to a limited extent on account of this disadvantage.

The combination of UV absorbents is preferably used in the form of a solution of UV absorbents in low-boiling solvents, as already described above. Incorporation of these solutions is carried out in a known manner by emulsification.

Since some of the UV absorbents II are themselves liquids, they may be regarded as "oil-forming agents" and solvents for the benzotriazole component of the combination of UV absorbents. The technique of emulsification does not give rise to any difficulties in this case since both types of UV absorbents are readily soluble in the low-boiling solvents which are used for the preparation of emulsions for photographic layers.

The UV absorbents used according to the invention, may of course, also be used in combination with other UV absorbents.

The combination of UV absorbents according to the invention does not affect the photographic properties of adjacent layers and in particular the color coupling reaction of dissolved color coupler is not slowed down. Many of the known UV absorbents are disadvantageous in this respect.

If the UV absorbents according to the invention are used in multi-layered color photographic materials, their concentration is chosen so that when the multi-layered materials are exposed to light the stability of the image dyes is equally good in all three layers.

The thickness of the protective layers which contain UV absorbents is 2–6 μm.

When the color image obtained after the usual color photographic processing is examined for its stability to light and compared with the color image obtained in the same color photographic material which does not contain these protective layers, it is found that an improvement by a factor of 4–10 has been obtained.

The improvement in light fastness is determined by exposing the two images at same color density until the same degree of bleaching has been reached in both cases. The ratio of lux hours required is a measure of the improvement factor. The improvement factor depends not only on the concentration of the UV absorbent but also on the thickness of the protective layer.

The layers which contain the UV absorbents are substantially clear and practically colorless when dry. They withstand the photographic process, e.g. color development, and are not destroyed. They are not washed out of the layer. No yellowing is observed after prolonged exposure to light.

The ultraviolet light absorbent compounds used according to the invention may be employed in the form of a dispersion in a binder applied as the uppermost protective layer to a processed material, i.e. a photographic material containing a finished colored photographic image, or to an unprocessed multi-layered color photographic material. The UV absorbents may also be added to the blue-sensitive silver halide emulsion layer which contains yellow coupler or to intermediate layers, for example to layers arranged between the silver halide emulsion layers.

The UV absorbents used according to the invention may be applied both to color photographic materials on a transparent support and to those mounted on an opaque layer support, e.g. a baryta paper support.

The layers which contain the combination of UV absorbents may be used in any color photographic materials in which protection of the image dyes against ultraviolet radiation is desired, regardless of the methods of preparation and processing employed. Such layers which contain UV absorbents may be used e.g. for conventional color photographic materials regardless of the arrangement used for the various layers for the partial color images and in particular they may also be used for the type of color photographic materials which are processed by high-speed processes at elevated temperatures and for materials which are used for dye diffusion processes or dye bleaching processes.

The following examples illustrate the invention:

EXAMPLE 1

The following layers are applied to a layer support of paper which is covered on both sides with a thin layer of white pigmented polyethylene:

(1) A red-sensitive silver chlorobromide gelatine emulsion layer containing a water-soluble, diffusion-fast Cyan coupler;

(2) An intermediate layer of gelatine;

(3) A layer containing a green-sensitive silver chlorobromide gelatine emulsion with a diffussion-fast magenta coupler;

(4) An intermediate gelatine layer;

(5) A silver bromide gelatine emulsion layer containing a diffusion-fast yellow coupler.

When dried, the material is cut up into several strips. A simple gelatine layer is applied in a thickness of 3 μm. to one of the strips.

On a parallel sample strip, a layer containing UV absorbents is applied from a casting solution of the following composition:

15 g. of compound I.3 and
15 g. of compound II.6 together with
4.5 g. of bis-(2-ethylhexyl) sulfosuccinate dissolved in
60 ml. of diethylcarbonate are emulsified in 1 litre of a 10% gelatine solution at 55° C.

The UV protective layer also has a thickness of 3 μm.

The two samples are exposed in the same manner and then processed in the usual way. The finished images, which have the same color density, are exposed to UV light until they have been bleached to the same degree. The improvement factor is given by the ratio of lux hours required for the two samples. It is in the region of 4–10, depending on the nature of the components used.

The layer of UV absorbents does not affect the photographic properties. The rate of development remains the same. A color fog is not obtained.

EXAMPLE 2

20 g. of compound I.13 or I.7 and
10 g. of compound II.7 together with
4.5 g. of bis-(2-ethylhexyl)sulfosuccinate dissolved in
60 ml. of diethylcarbonate are emulsified in one litre of a 10% gelatine solution at 55° C.

EXAMPLE 3

20 g. of compound I.9 or I.10 and
10 g. of compound II.5 together with
4.5 g. of bis-(2-ethylhexyl)sulfosuccinate dissolved in
60 ml. of diethylcarbonate are emulsified in 1 litre of a 10% gelatine solution at 55° C.

EXAMPLE 4

25 g. of compound I.12 or I.16 and
7.5 g. of compound II.3 together with
4.5 g. of bis-(2-ethylhexyl)sulfosuccinate dissolved in
60 ml. of diethylcarbonate are dissolved in 1 litre of a 10% gelatine solution at 55° C.

In the above Examples 2–4, the layers containing UV absorbents are again substantialy clear and provide excellent protection for the underlying color photographic image. A particular advantage is that the combination of UV absorbents protects the colored images even against the long-waved region of the ultra-violet part of the spectrum. Another advantage is the ease with which the layers which contain UV absorbent can be worked up. With this combination of UV absorbents, the tendency of UV absorbents to crystallize is substantially avoided even in those layers which have a relatively high concentration of active compound.

What we claim is:

1. A photographic material comprising a support, at least one photographic gelatino-silver halide emulsion layer and coated over said emulsion layer at least one UV absorbent layer which contains an UV absorbent mixture of a 2 - (2' - hydroxyphenyl) - benzotriazole compound which contain attached to the benzo ring or attached to the phenolic benzene ring at least one alkyl or alkoxy group with a total of 6–18 C-atoms or a cycloaliphatic group and an alkyl or alkoxy group with up to 12 C-atoms and in addition an UV absorber condensation compound having a melting point below 60° C. represented by the following formula:

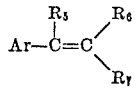

wherein
$R_5$ = (1) hydrogen, (2) alkyl, (3) cycloalkyl, (4) aralkyl, (5) phenyl or (6) alkoxy;
$R_6$ = (1) nitrile, (2) carboxyl, (3) esterified carboxyl or (4) acyl;
$R_7$ = hydrogen or $R_6$;
Ar = a benzene ring which is substituted with one or more hydroxyl groups or alkoxy groups.

2. A photographic material as claimed in claim 1 which contains a benzotriazole UV absorbent of the following formula:

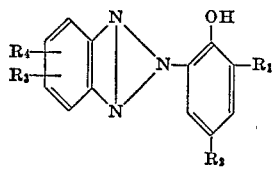

wherein
$R_1$ = (1) hydrogen, (2) alkyl, (3) cycloalkyl, (4) halogen, (5) a substituent of the phenyl series or (6) phenoxy;
$R_2$ = (1) hydrogen, (2) alkyl, (3) cycloalkyl, (4) alkoxy, (5) halogen, (6) phenyl or (7) phenoxy;
$R_3$ = (1) hydrogen, (2) alkyl, (3) alkoxy, (4) halogen, (5) phenyl or (6) phenoxy;
$R_4$ = (1) hydrogen, (2) alkyl, (3) alkoxy or (4) halogen.

3. A photographic material as claimed in claim 2 in which $R_1$ and $R_2$ denote branched alkyl groups having a total of 6-12 C-atoms, $R_3$ denotes hydrogen and $R_4$ denotes chlorine or alkyl or alkoxy with up to 3 C-atoms.

4. A photographic material as claimed in claim 1 in which Ar denotes a methoxy-substituted benzene ring, $R_5$ denotes methyl, $R_6$ nitrile and $R_7$ a carboxyl group which is esterified with a branched aliphatic alcohol having 6-12 C-atoms.

5. A photographic material as claimed in claim 1 in which the 2-(2'-hydroxyphenyl)-benzotriazole compounds and the condensation compound are employed in a weight ratio between 1:1 and 1:4.

6. A finished photographic material comprising a support having thereon a plurality of developed and fixed photographic emulsion layers containing dye images at least one of said dye images being subject to fading by the action of ultraviolet radiation, said emulsion layer containing a dye image subject to fading lying between said support and an UV absorbent layer containing an ultra-violet absorbing mixture of a 2-(2'-hydroxyphenyl)-benzotriazole compound which contain attached to the benzo ring or attached to the phenolic benzene ring at least one alkyl or alkoxy group with a total of 6-8 C-atoms or a cycloaliphatic group and an alkyl or alkoxy group with up to 12 C-atoms and in addition, an UV absorber condensation compound having a melting point below 60° C. represented by the following formula:

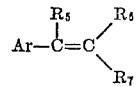

wherein
$R_5$ = (1) hydrogen, (2) alkyl, (3) cycloalkyl, (4) aralkyl, (5) phenyl or (6) alkoxy;
$R_6$ = (1) nitrile, (2) carboxyl, (3) esterified carboxyl or (4) acyl;
$R_7$ = hydrogen or $R_6$;
Ar = a benzene ring which is substituted with one or more hydroxyl groups or alkoxy groups.

7. A finished photographic material as claimed in claim 6 which contains a benzotriazole UV absorbent of the following formula:

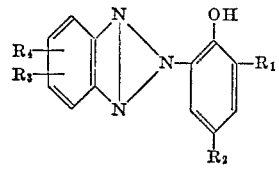

wherein
$R_1$ = (1) hydrogen, (2) alkyl, (3) cycloalkyl, (4) halogen, (5) a substituent of the phenyl series or (6) phenoxy;
$R_2$ = (1) hydrogen, (2) alkyl, (3) cycloalkyl, (4) alkoxy, (5) halogen, (6) phenyl or (7) phenoxy;
$R_3$ = (1) hydrogen, (2) alkyl, (3) alkoxy, (4) halogen, (5) phenyl or (6) phenoxy;
$R_4$ = (1) hydrogen, (2) alkyl, (3) alkoxy or (4) halogen.

8. A finished photographic material as claimed in claim 7 in which $R_1$ and $R_2$ denote branched alkyl groups having a total of 6-12 C-atoms, $R_3$ denotes hydrogen and $R_4$ denotes chlorine or alkyl or alkoxy with up to 3 C-atoms.

9. A finished photographic material as claimed in claim 6 in which Ar denotes a methoxy-substituted benzene ring, $R_5$ denotes methyl, $R_6$ nitrile and $R_7$ a carboxyl group which is esterified with a branched aliphatic alcohol having 6-12 C-atoms.

10. A finished photographic material as claimed in claim 6 in which the 2-(2'-hydroxyphenyl)-benzotriazole compounds and the condensation compounds are employed in a weight ratio between 1:1 and 1:4.

References Cited
UNITED STATES PATENTS

| | | | |
|---|---|---|---|
| 3,533,794 | 10/1970 | Ohi et al. | 96—84 |
| 3,350,204 | 10/1967 | Smith et al. | 96—84 |
| 3,244,524 | 4/1966 | Trucker | 96—84 |
| 3,278,448 | 10/1966 | Lauerer et al. | 252—300 |
| 3,052,636 | 9/1962 | Strobel et al. | 252—300 |

FOREIGN PATENTS

| | | | |
|---|---|---|---|
| 1,087,902 | 2/1961 | Germany | 96—84 |

RONALD H. SMITH, Primary Examiner

U.S. Cl. X.R.

252—300; 117—33.3